US010106243B2

(12) United States Patent
Keavney et al.

(10) Patent No.: US 10,106,243 B2
(45) Date of Patent: Oct. 23, 2018

(54) DEPLOYABLE WING FOR AN AIRCRAFT

(71) Applicants: Thomas E. Keavney, Lakewood, CA (US); John C. Rufino, Long Beach, CA (US)

(72) Inventors: Thomas E. Keavney, Lakewood, CA (US); John C. Rufino, Long Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 396 days.

(21) Appl. No.: 15/096,998

(22) Filed: Apr. 12, 2016

(65) Prior Publication Data
US 2017/0291683 A1 Oct. 12, 2017

(51) Int. Cl.
B64C 3/30 (2006.01)
B64C 3/54 (2006.01)

(52) U.S. Cl.
CPC .............. B64C 3/30 (2013.01); B64C 3/54 (2013.01); B64C 2003/543 (2013.01)

(58) Field of Classification Search
CPC .................................. B64C 3/30; B64C 3/54
See application file for complete search history.

(56) References Cited

U.S. PATENT DOCUMENTS

| | | | |
|---|---|---|---|
| 3,135,482 A | | 6/1964 | Girard |
| 3,796,398 A * | | 3/1974 | Eilertson ............... B64D 17/80 244/139 |
| 4,261,534 A * | | 4/1981 | Roselli ..................... B64C 1/34 239/2.1 |
| 5,673,875 A | | 10/1997 | Martin et al. |
| 6,164,595 A * | | 12/2000 | Williams ............... B64D 17/80 244/139 |
| 6,364,251 B1 * | | 4/2002 | Yim ......................... B64C 3/30 244/123.11 |
| 6,398,160 B1 * | | 6/2002 | Hsia ........................ B64C 3/30 244/123.11 |
| 6,808,144 B1 * | | 10/2004 | Nicolai ................. B64C 39/024 244/139 |
| 6,877,690 B1 * | | 4/2005 | Bragg ....................... B60F 5/02 244/2 |
| 7,487,939 B1 * | | 2/2009 | Christof ................. B64D 17/80 244/139 |
| 8,104,718 B2 * | | 1/2012 | Shaw ....................... B64C 3/30 244/139 |
| 2003/0192985 A1 * | | 10/2003 | Lipeles .................... B64C 3/30 244/13 |
| 2003/0209634 A1 * | | 11/2003 | Preston .................... B64C 3/30 244/145 |

(Continued)

Primary Examiner — Christopher P Ellis
(74) Attorney, Agent, or Firm — Tarolli, Sundheim, Covell & Tummino LLP

(57) ABSTRACT

An apparatus for selectively increasing a wing area of an aircraft having a fuselage with an interior space includes an inflatable wing moveable between a stowed condition located in the interior space and a deployed condition located outside the interior space. A plurality of reels is secured to the aircraft. A plurality of suspension lines connects the wing to the reels. At least one reel is operable to unwind a corresponding suspension line to allow the wing to inflate to the deployed condition exclusively by ram air generated by movement of the aircraft. A method of use for a deployable wing is also provided.

18 Claims, 13 Drawing Sheets

(56) References Cited

U.S. PATENT DOCUMENTS

| | | | |
|---|---|---|---|
| 2003/0218099 A1* | 11/2003 | Preston | B60F 5/006 244/138 R |
| 2007/0023566 A1* | 2/2007 | Howard | B60F 5/02 244/2 |
| 2010/0185346 A1* | 7/2010 | Surmont | B64B 1/06 701/4 |

* cited by examiner

DEPLOYABLE WING FOR AN AIRCRAFT

TECHNICAL FIELD

This disclosure relates to an apparatus and method for use of a deployable wing for an aircraft and, more particularly, to a method and apparatus for selectively increasing a wing area of an aircraft having a fuselage with an interior space.

BACKGROUND

Current state-of-the-art high-speed aircraft may have difficulty operating at low speed, such as for takeoff, landing, and loitering. Greater wing area would facilitate selective low-speed operation of normally high-speed aircraft. However, there are many design trade-offs, such as a significant weight increase, needed to provide a high-speed aircraft with increased wing area using current design principles.

SUMMARY

In an embodiment, an apparatus for selectively increasing a wing area of an aircraft having a fuselage with an interior space is described. The apparatus includes an inflatable wing moveable between a stowed condition located in the interior space and a deployed condition located outside the interior space. A plurality of reels is secured to the aircraft. A plurality of suspension lines connects the wing to the reels. At least one reel is operable to unwind a corresponding suspension line to allow the wing to inflate to the deployed condition exclusively by ram air generated by movement of the aircraft.

In an embodiment, an aircraft is described. An outer mold line is on a fuselage of the aircraft. An interior space is within the fuselage. An inflatable wing is moveable between a stowed condition, wherein the wing is substantially contained within the interior space and a deployed condition, wherein the inflatable wing is located wholly outside the outer mold line, in the ambient space. The inflatable wing includes substantially planar flexible upper and lower wing panels attached together at an aft edge thereof and including space vertically therebetween, when the wing is in the deployed condition, to form a wing interior configured to accept, and thus become inflated by, ram air flow. A plurality of reels is secured to the aircraft within the interior space. A plurality of selectively vertically extending suspension lines connects the wing to the reels. At least one reel is selectively operable to extend a corresponding suspension line to allow the wing to inflate to the deployed condition exclusively by ram air flow generated by movement of the aircraft. At least one reel is selectively operable to retract a corresponding suspension line to control deflation of the wing and return of the wing into the stowed condition.

In an embodiment, a method of use for a deployable wing for an aircraft having a fuselage with an interior space is described. An inflatable wing selectively movable between stowed and deployed conditions is provided. The wing has an open fore edge and a substantially closed aft edge and a wing interior located laterally therebetween. The wing is secured to the aircraft at least by a plurality of suspension lines connecting the wing to a plurality of reels in the interior space. The wing is substantially contained within the interior space when the wing is in the stowed condition. The open fore edge of the wing is exposed to ram air generated by movement of the aircraft to allow the wing interior to inflate with the ram air.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

Figure 1A:
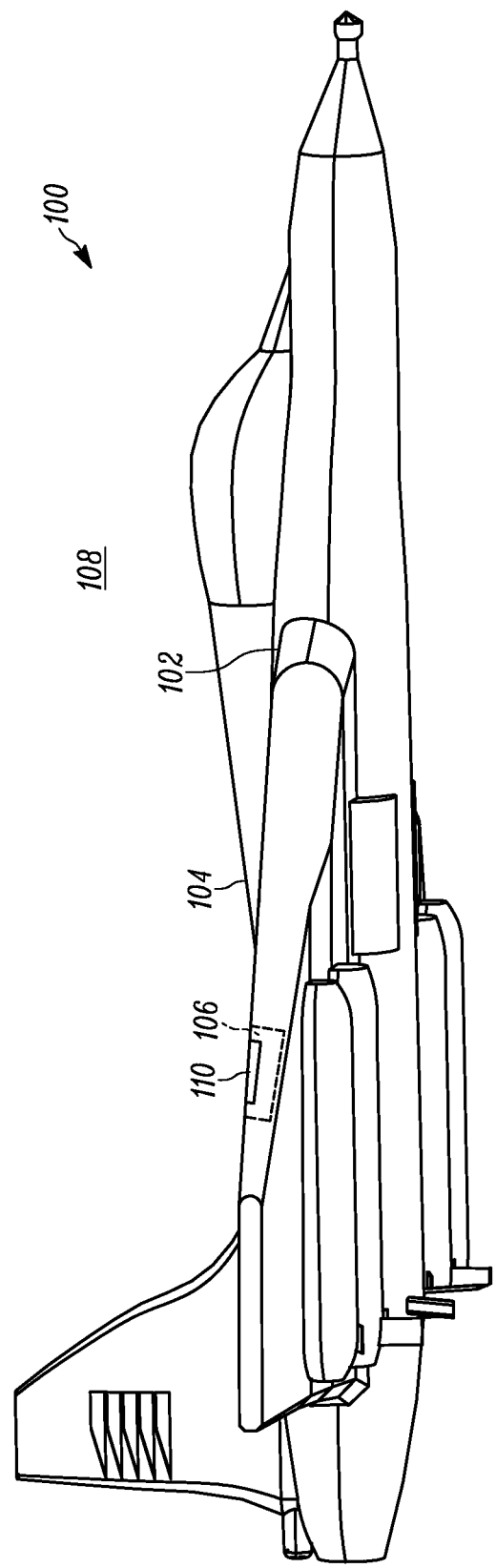
FIG. 1A is a schematic side view of an aircraft with one aspect of the invention in a stowed condition.
Figure 1B:
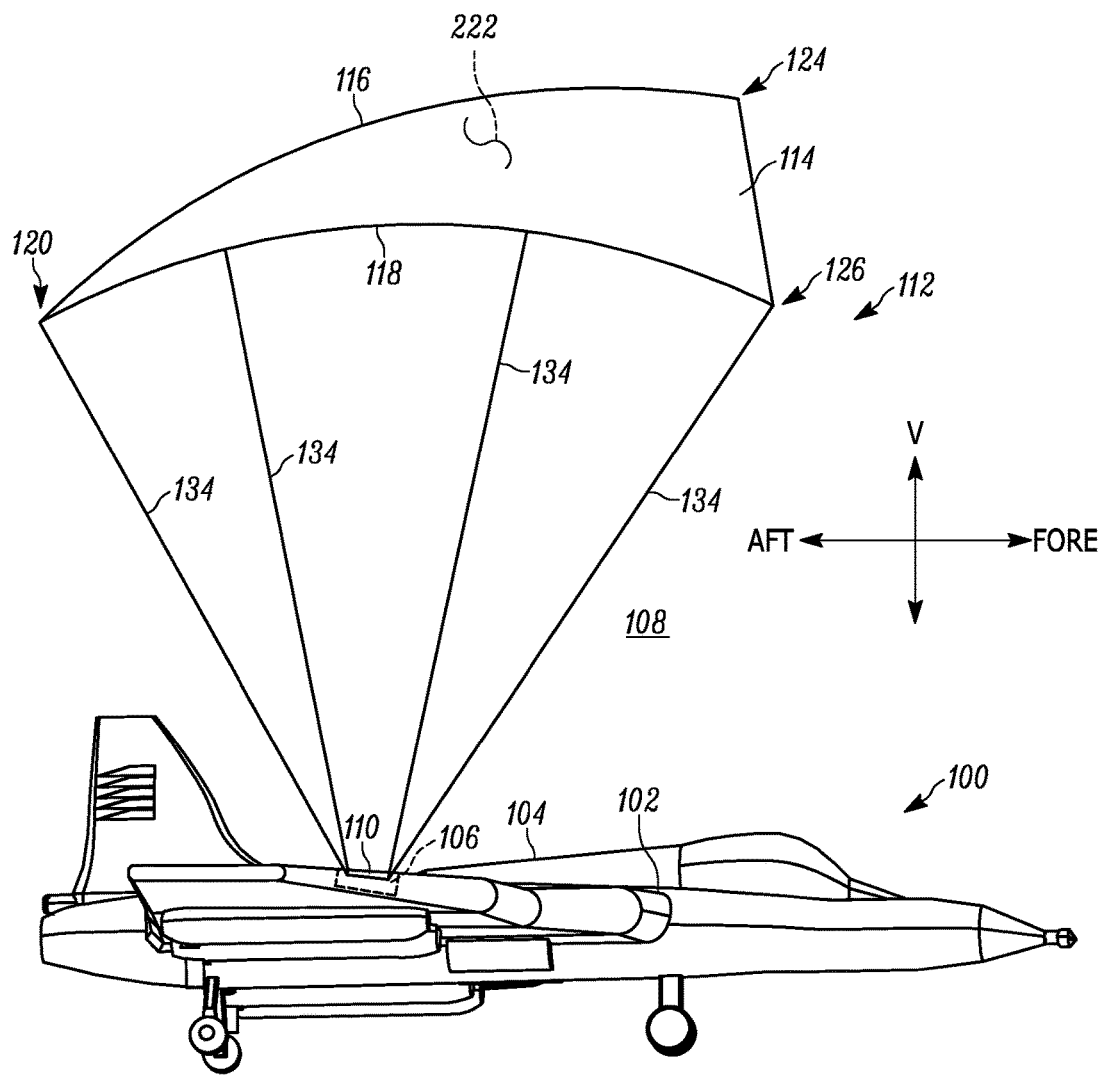
FIG. 1B is a schematic side view of the aircraft of FIG. 1A with the aspect of the invention in a deployed condition.

FIGS. 1A-1B depict an aircraft 100. A fuselage 102 of the aircraft 100 has an outer mold line 104. An interior space (shown in dashed line as 106) of the aircraft 100 may be separated from ambient space 108 by a compartment door 110 in the outer mold line 104. An apparatus 112 is provided for selectively increasing a wing area of the aircraft 100. The apparatus 112 includes an inflatable wing 114 moveable between a stowed condition (shown in FIG. 1A) where the wing 114 is located in the interior space 106 and a deployed condition (shown in FIG. 1B) where the wing 114 is located outside the interior space 106. For example, the wing 114 could be substantially contained within the interior space 106 in the stowed condition and located wholly outside the outer mold line 104, in the ambient space 108, in the deployed condition.

The inflatable wing 114 may include at least one substantially planar flexible upper wing panel 116 and at least one substantially planar flexible lower wing panel 118 (one of each being presumed in the below description). The wing 114, or structures thereof—such as the upper and lower wing panels—could be made of any desired material including, but not limited to, fabric or any other flexible sheet material, whether or not fabric-reinforced. For example, the wing 114 could be made substantially from a flexible fabric material, and will be described herein as such. Aft portions of the upper and lower wing panels 116 and 118 are attached together at an aft edge 120 of the wing 114, which is substantially closed. This attachment, as well as other attachments of the flexible sheet materials discussed herein could be accomplished in any desired manner such as, but not limited to, sewing, heat welding, and adhesive bonding.

Each of the upper and lower wing panels 116 and 118 may be significantly longer in a starboard-port direction ("span") than in a fore-aft direction ("chord"). For example, aspect ratios (span/chord for rectangular wings, span squared over area for general wings) of ram air wings may be between 2 and 3. Wings 114 having lower or higher aspect ratios may be designed, but those wings 114 with low aspect ratios tend to have poor aerodynamic performance, and those with higher aspect ratios require more interior structure and suspension lines, thus increasing complexity. While the wing 114 is depicted herein as being a rectangular wing (a relatively simple configuration), seen in plan view, any desired wing 114 shape could be provided by one of ordinary skill in the art, such as, but not limited to, a non-rectangular wing shape (e.g. elliptical).

Figure 2A:
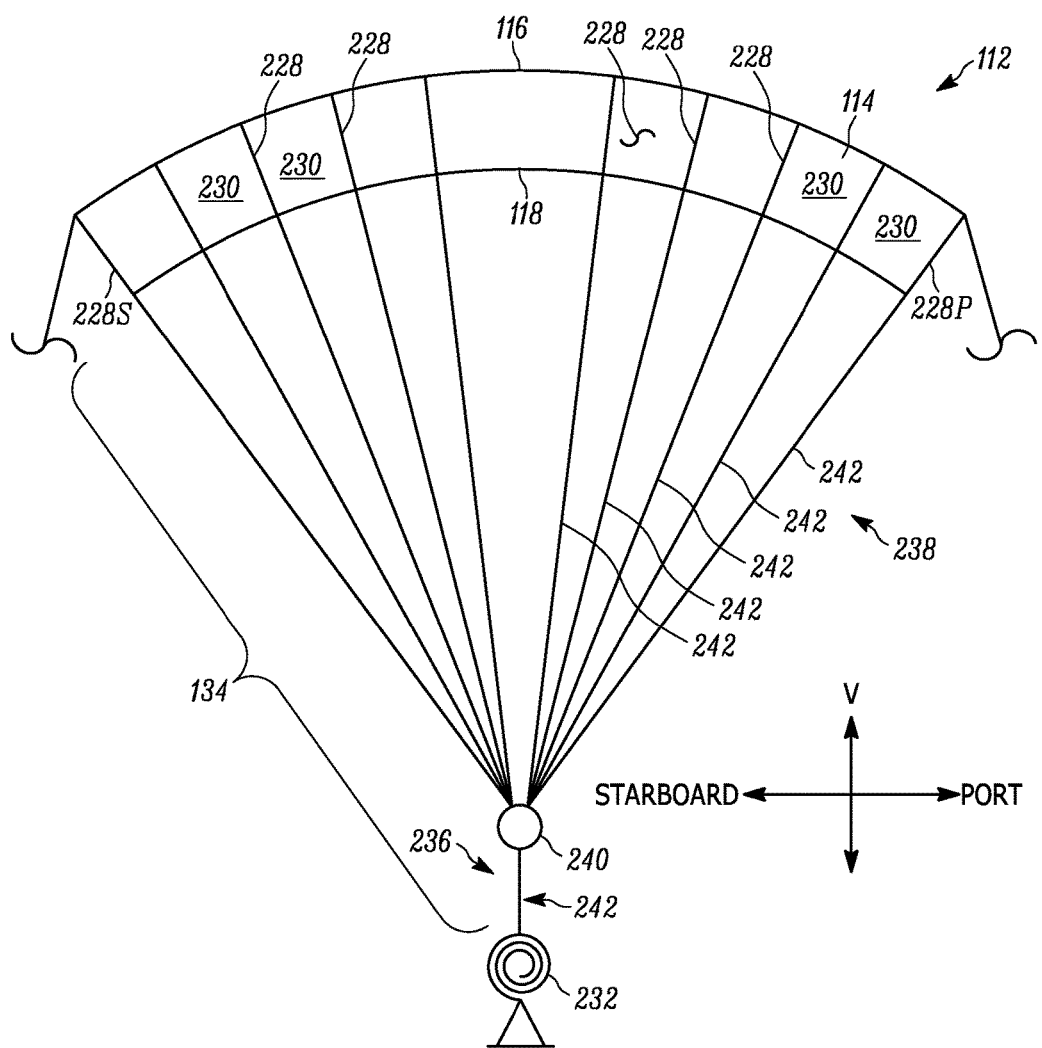
FIG. 2A is a schematic front view of the aspect of FIGS. 1A-1B in a deployed condition.
Figure 2B:
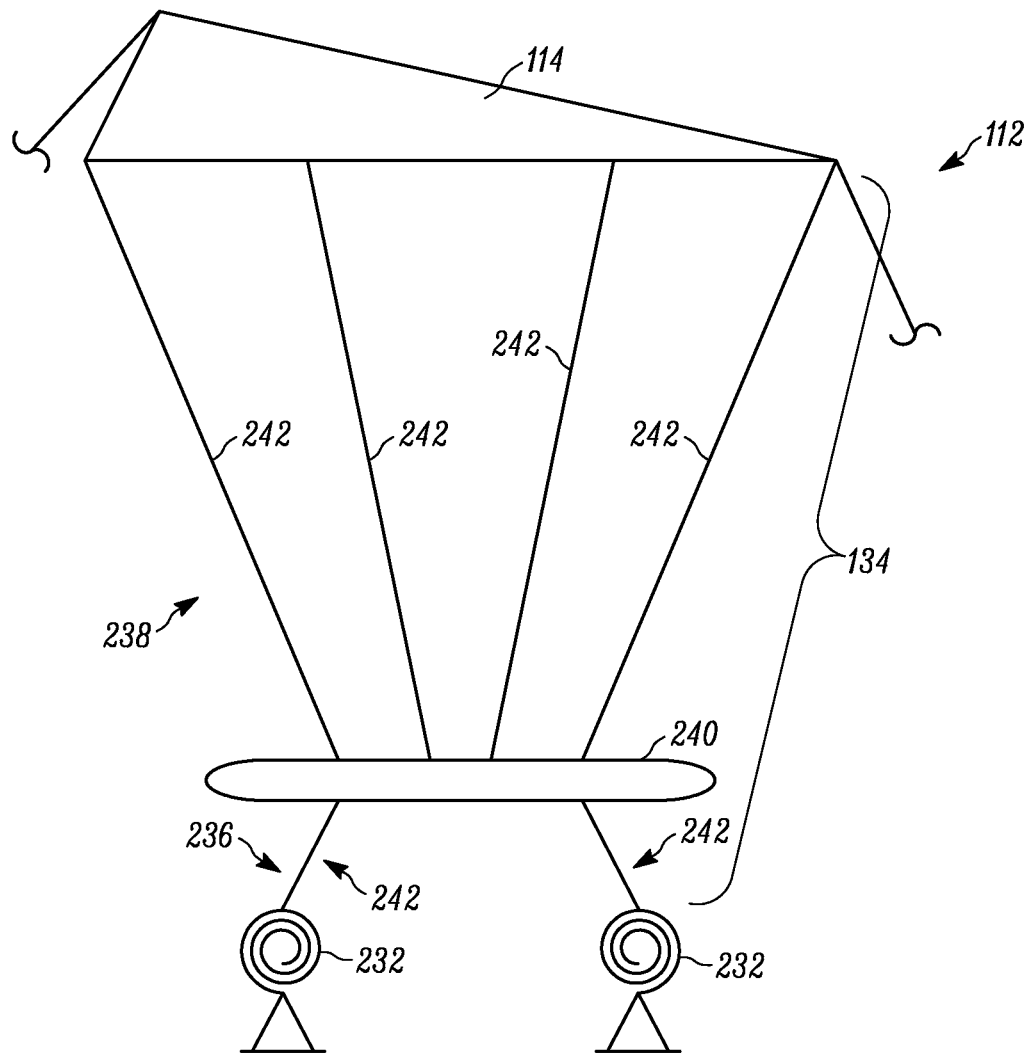
FIG. 2B is a schematic side view corresponding to FIG. 2A.

The upper and lower wing panels 116 and 118 include space vertically (i.e., in a direction parallel to line "V" shown in the Figures) therebetween, when the wing 114 is in the deployed condition as shown at least in FIGS. 1B and 2A-2B. (The term "vertical" is used herein as a relative, not absolute, direction.) The upper and lower wing panels 116 and 118 thus cooperate to form a wing interior 222 which is substantially closed at the aft edge 120 of the wing, with the fore portions 224 and 226, respectively, of the upper and lower wing panels 116 and 118 being spaced apart when the wing 114 is in the deployed condition. The wing interior 222 is configured to accept, and thus become exclusively inflated into the deployed condition by, ram air flow generated by movement of the aircraft. The upper and lower wing panels 116 and 118 could be attached together across the entirety of the aft edge 120 of the wing 114, or there could be one or more gaps between the upper and lower wing panels 116 and 118 at the aft edge 120 for any desired purpose, including allowing selective ram air flow out of the wing interior through the aft edge 120, and/or to facilitate deflation of the wing 114 during retraction and stowage.

When in the deployed condition, the wing 114 may be curved convexly-upward (i.e., in a "frowning" configuration as shown in FIG. 1B) in the fore-aft direction and/or may be curved convexly upward (i.e., in a "frowning" configuration as shown in FIG. 2A) in the starboard-port direction.

At least one flexible interior baffle 228 may extend vertically between, and substantially perpendicular to, the upper and lower wing panels 116 and 118. Each interior baffle 228, when present, may be substantially oriented in a fore-aft direction to partition the wing interior 222 into a plurality of interior compartments 230 spaced apart from one another in the starboard-port direction. The interior baffles 228 may help to maintain vertical spacing along the starboard-port and/or fore-aft expanses of the upper and lower wing panels 116 and 118. Optionally, the interior baffles 228S and 228P at the extreme starboard and port edges of the wing 114 may serve as vertically-oriented "sidewalls" of the wing interior 222.

The apparatus 112 includes a plurality of reels (shown schematically at 232 in FIGS. 2A-2B) secured to the aircraft 100 in any suitable manner, such as by being bolted or otherwise fastened to a structural member of the aircraft 100 within the interior space 106. The term "reel" is used herein primarily to indicate a revolvable device on which something flexible (described herein as a suspension line, as discussed in detail below) is wound, but the term "reel" should also be considered to encompass any other device or mechanism, whether or not revolvable which is capable of selectively changing an effective length of a suspension line. For example, a "reel", as used herein, would encompass, but not be limited to, a windlass, block and tackle, linear actuator, or any other line retraction/extension aid. The terms "wind" and "unwind" are used herein to reference, respectively, decreasing and increasing an effective length of the suspension lines, regardless of whether rotary motion is involved. The reels 232 may be configured for selective operation to selectively change a surface area of a forward edge of the wing 114 during transition of the wing 114 between the stowed and deployed conditions, as will be discussed below with reference to FIGS. 3A-8B.

A plurality of suspension lines 134 connects the wing 114 to the reels 232. At least one reel 232 is selectively operable to extend (e.g., unwind) a corresponding suspension line 134 to allow the wing 114 to inflate to the deployed condition exclusively by ram air generated by movement of the aircraft 100. At least one reel 232 (optionally the same reel as the extending/unwinding reel) is selectively operable to retract (e.g., wind) a corresponding suspension line 134 to control deflation of the wing 114 and return of the wing 114 into the stowed condition. The suspension lines 124 could have any desired configuration, be attached to the reel(s) 232 and the wing 114 in any desired manner, and be made of any desired material(s), such as, but not limited to, nylon and Spectra®, available from Honeywell International, Inc. of Morris Plains, N.J. The suspension lines 124 can be made of any flexible cord, cable, rope, or the like, but should be strong, stiff, flexible, and resistant to vertical stretching for most use environments of the apparatus 112.

As shown schematically in FIG. 2A, at least one suspension line 134 may be a "cascading" line, having vertically spaced proximal and distal line portions 236 and 238, respectively, with at least one line junction 240 located vertically therebetween. (For example, there could be multiple 2-1 cascades, with more individual line strands above each junction than below it along the length of a suspension line 134.) However, for ease of description, this description presumes a single line junction 240 separating the proximal and distal line portions 236 and 238.

The proximal line portion 236 has a single line strand 242 and is connected to a selected reel 232. The distal line portion 238 includes a plurality of line strands 242, each line strand 242 being connected to the wing 114 at a location spaced along the wing 114 from the connection locations of the other line strands 242 of that suspension line 134. The plurality of line strands 242 of the distal line portion 238 are aggregated at the line junction 240 into the single line strand 242 of the proximal line portion 236 which is connected to the selected reel 232.

This arrangement permits concurrent positioning and control of the multiple line strands 242 of the distal line portion 238 through control of the proximal line portion 236, and thus allows a user to concurrently and similarly effect multiple line attachment locations along the wing 114. For example, retraction of a single proximal line portion 236 could cause concurrent vertical movement of an entire line (e.g., a fore-aft line corresponding to an interior baffle) of the lower wing panel 118 if the line strands 242 of the distal line portion 238 of that same suspension line 134 are attached along that line of the lower wing panel 118. This principle is similar to that used in the construction and operation of parachuting parafoils.

Figure 3A:
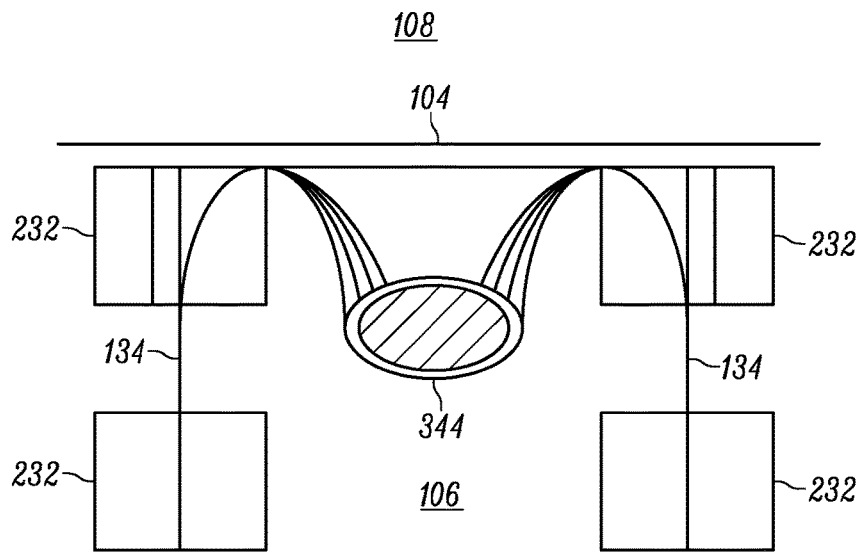
FIGS. 3A, 4A, 5A, 6A, 7A, and 8A are schematic front views of the aspect of FIGS. 1A-1B in an example sequence of use.

As shown in FIGS. 3A-8B, a canopy tube 344 may be located within the interior space 106. The canopy tube 344, when present, may be configured to at least partially contain the inflatable wing 114 in the stowed condition, which is shown in FIGS. 3A-3B.

An example use sequence for the apparatus 112 is shown schematically in FIGS. 3A-8B, with the "A"-suffixed Figures being schematic front views and the "B"-suffixed Figures being schematic side views of the apparatus 112. In FIGS. 3A-8B, as in all of the Figures, element number labels were intentionally omitted from certain duplicative structures for clarity, though one of ordinary skill in the art will be able to extrapolate and analogize which unnumbered structures are similar to those numbered. There is no particular meaning or significance intended by which of a plurality of structures of a certain type are numbered and which are left unnumbered. It should be noted, however, that in the schematic views of FIGS. 3A-8B, the number and type of suspension lines intentionally change from one Figure to another (certain of the true number of suspension lines are omitted from particular views for clarity). Additionally, all of the suspension lines 134 are shown in this group of Figures as single line strands, while in actuality a single "suspension line 134" as shown in FIGS. 3A-8B could include multiple line strands 242 and the aforementioned proximal and distal line portions 236 and 238 as desired for a particular use application.

Figure 3B:
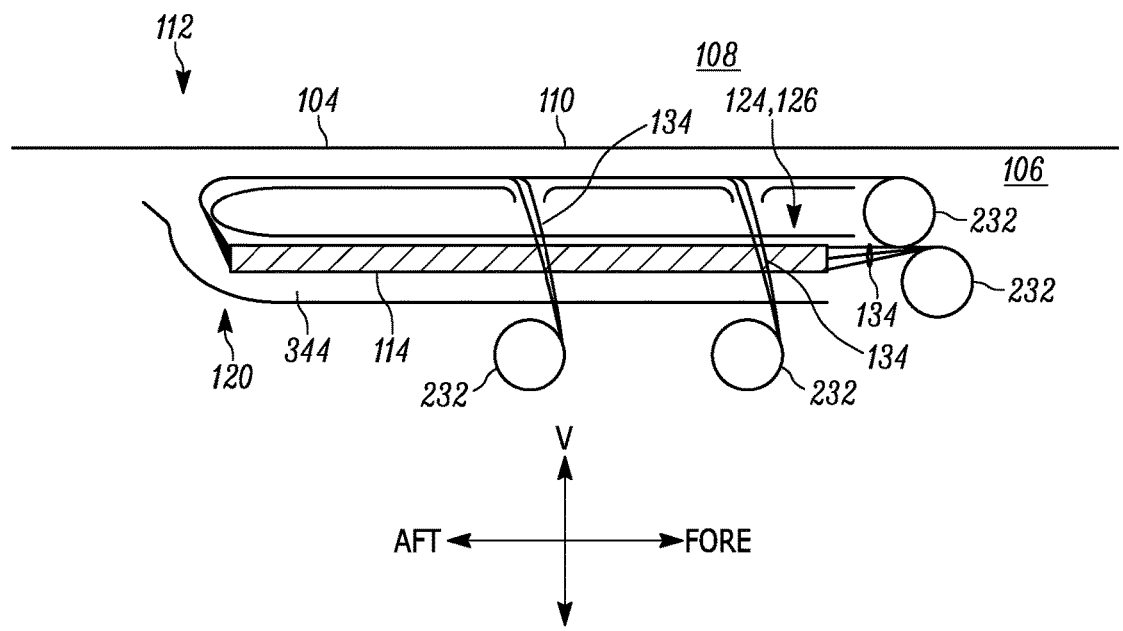
FIGS. 3B, 4B, 5B, 6B, 7B, and 8B are schematic side views, corresponding to FIGS. 3A, 4A, 5A, 6A, 7A, and 8A, respectively, of the aspect of FIGS. 1A-1B in an example sequence of use.

In FIGS. 3A-3B, the wing 114 is substantially contained within the interior space 106 (here, within the canopy tube 344 located in the interior space 106) and the wing 114 is in a fully stowed condition, with the compartment doors 110 (when present) closed to maintain the outer mold line 104 contour of the aircraft 100. Alternately, it is contemplated that the interior space 106 could be open to the ambient space 108 at all times, with no compartment doors 110 provided—for example, in a relatively low-speed aircraft, for simplicity of design. It should be noted that the fore portions 124 and 126 of the upper and lower wing panels 116 and 118 are located, in the stowed position, aft of the aft edge 120 of the wing, as will be explained below.

Figure 4A:
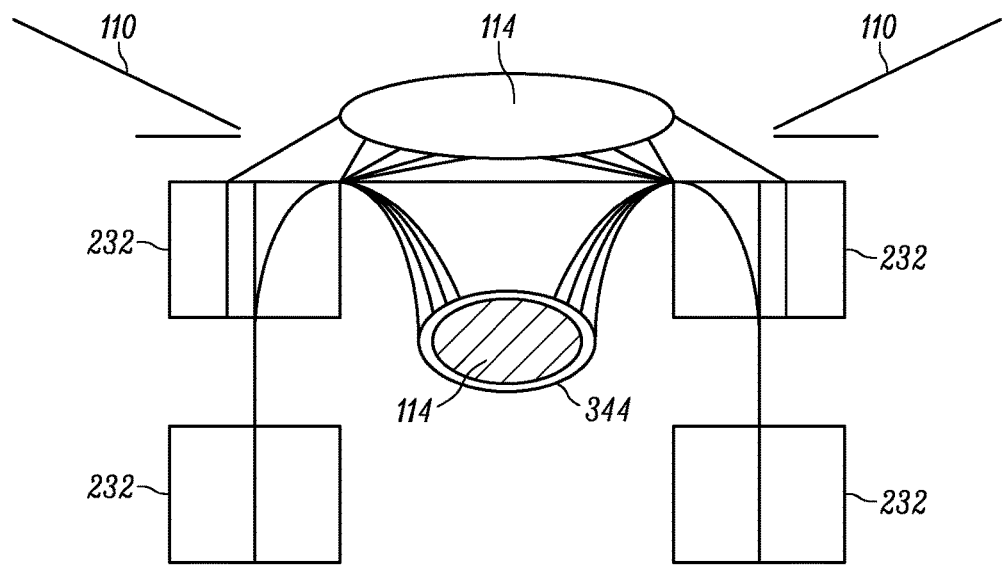
Figure 4B:
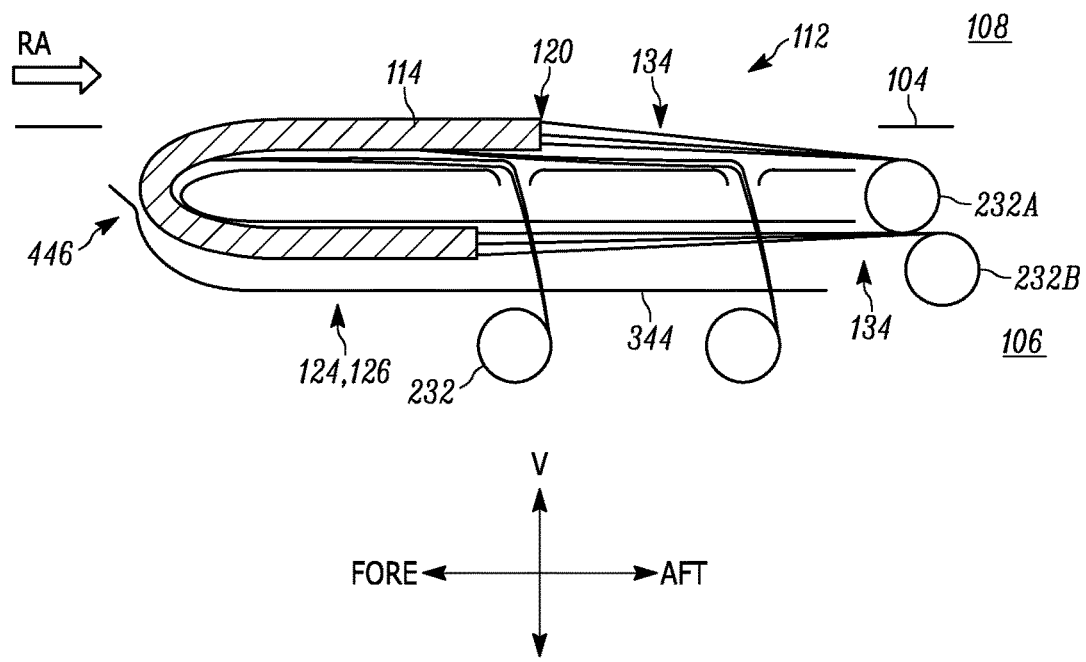

Turning to FIGS. 4A-4B, the compartment doors 110 have been actuated in any suitable manner (e.g., hydraulically) to open the interior space 106 to ambient space 108, when such compartment doors 110 are present, and motion of the aircraft 100 is causing ram air to flow in direction RA along the fuselage 102 of the aircraft 100. A selected reel 232A has been actuated to retract, or shorten, the corresponding suspension lines 134 attached to the aft edge 120 of the wing 114 in coordination with another reel 232B extending the corresponding suspension lines 134 attached to the fore portions 124 and 126 of the upper and lower wing panels 116 and 118.

Whether or not the reels 232 and suspension lines 134 are connected and operated as just mentioned, however, at least one reel 232 may be operated to pull the aft edge 120 of the wing 114 in an aft direction from a fore opening 446 of the canopy tube 344. (Thus pulling the fore portions 124 and 126 of the upper and lower wing panels 116 and 118 in a fore direction within the canopy tube 344.) Pulling the stowed wing 114 into the partially deployed position of FIGS. 4A-4B by "bending" the fabric of the wing 114 around a fore-first, aft-second "U"-shaped path from the interior space 106 helps to avoid unwanted premature inflation of the wing interior 222 by ensuring that the open fore portion of the wing 114 (formed at least partially by the fore portions 124 and 126 of the upper and lower wing panels 116 and 118) is the last part of the wing 114 exposed to the onrushing ram air.

Figure 5A:
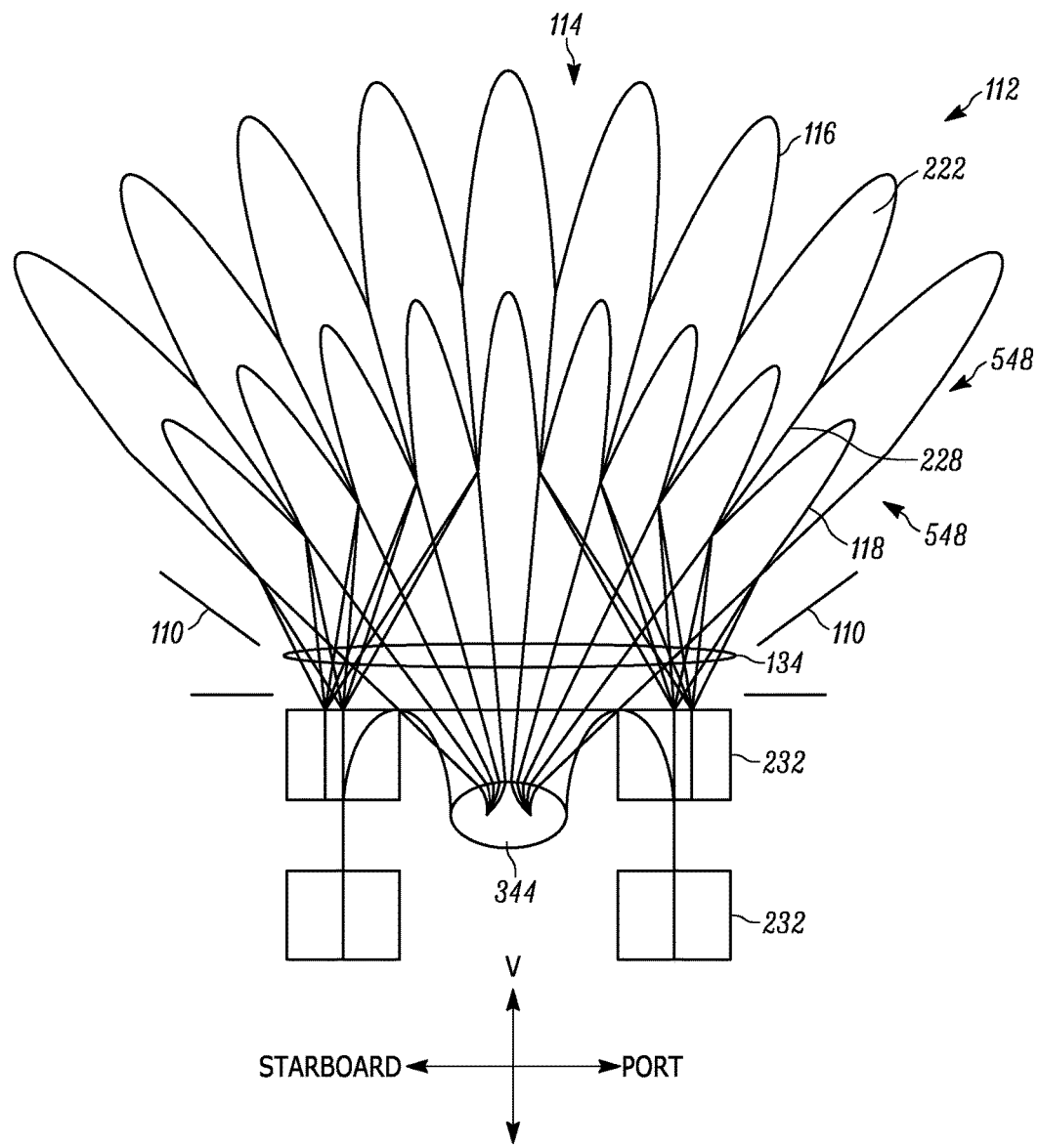
Figure 5B:
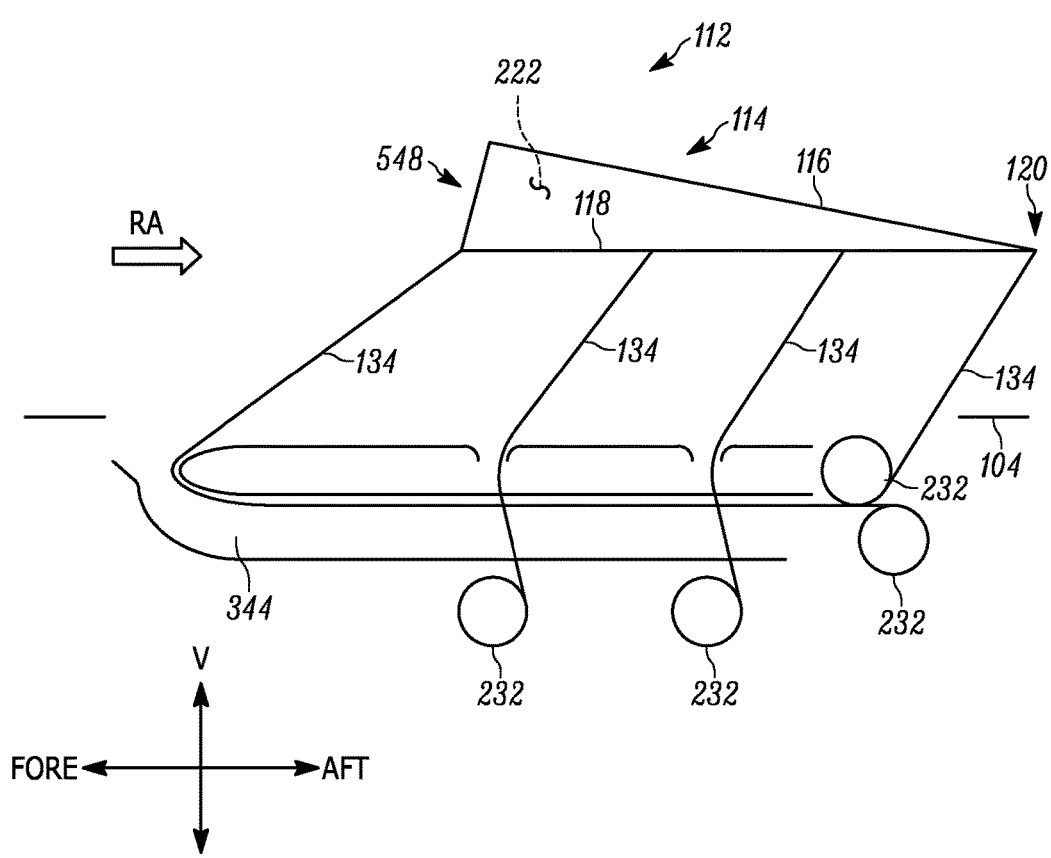

Turning to FIGS. 5A-5B, the open fore edge 548 of the wing 114 is beginning to be exposed to ram air generated by movement of the aircraft 100, with these Figures showing the wing 114 in a partially deployed position, slightly more deployed than in FIGS. 4A-4B. This exposure to ram air, now that the entire wing 114 has left the interior space 106, allows the wing interior 222 to begin to inflate with the ram air flow. It should be noted that no additional inflation or stiffening means are provided to the wing 114, other than the force of ram air flow, during deployment. Particularly when the wing 114 is partially inflated, as shown in FIGS. 5A-5B, selective operation of at least one reel 232 can be used to selectively change a surface area of the open fore edge 548 of the wing 114 during transition of the wing 114 between the stowed and deployed positions. For example, and as shown in FIG. 5A, the suspension lines 134 attached to the interior baffles 228 are "reined in" to facilitate controlled and gradual deployment of the wing 114 rather than a sudden and undesirable, "brake-chute" style snapping open of the wing 114 under force of the onrushing ram air flow, which could result in tangled suspension lines 134 or other damage to the apparatus 112, such as tearing of the material of the wing 114.

Figure 6A:
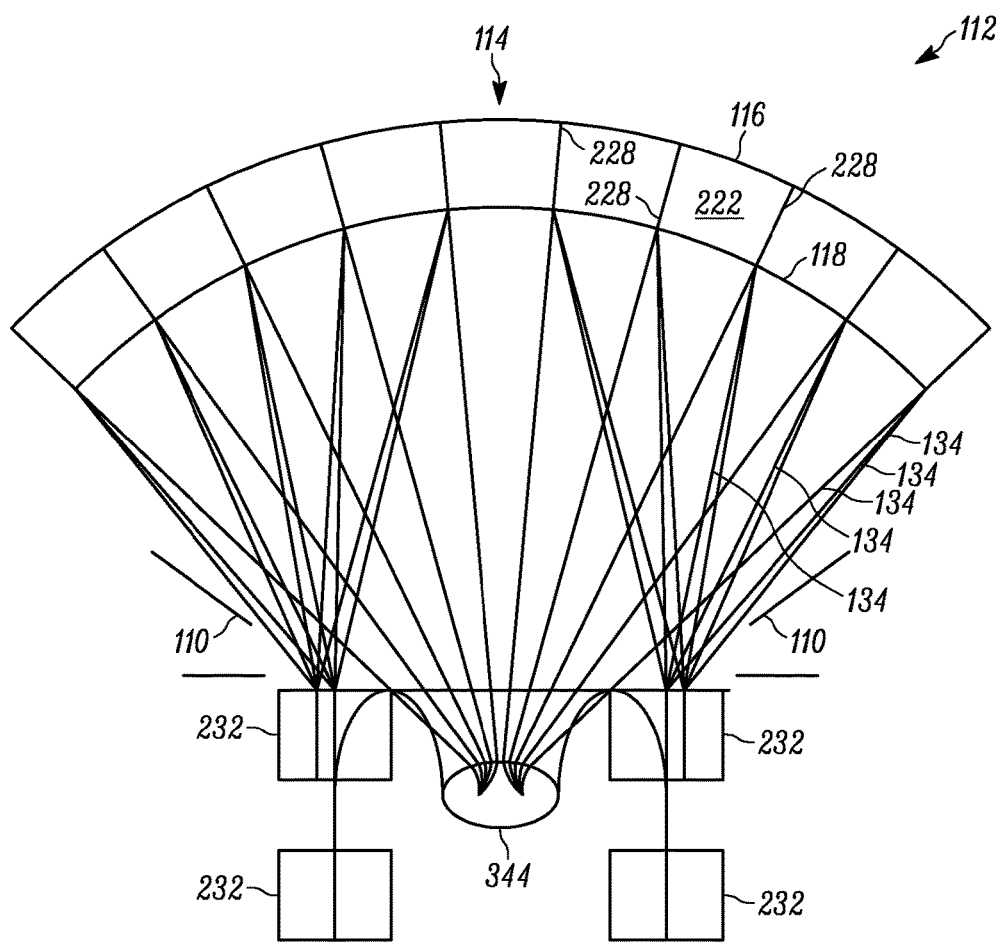
Figure 6A:
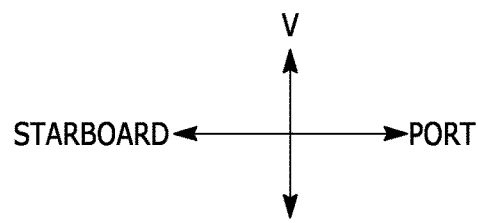
Figure 6B:
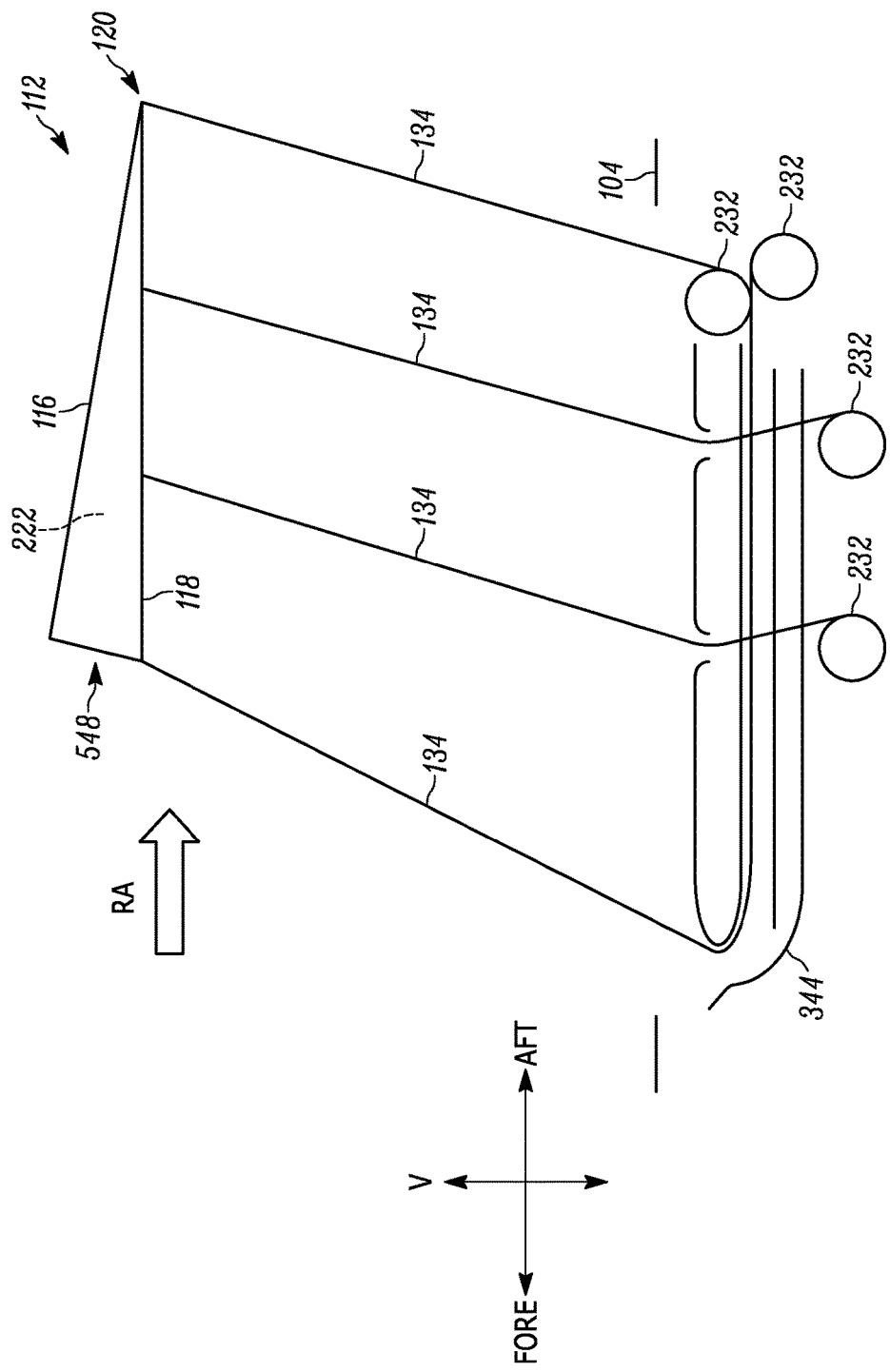

In FIGS. 6A-6B, the wing 114 has reached a fully deployed condition, with the wing interior 222 inflated by ram air flow as desired. The apparatus 112 can now be used to provide on-demand additional wing surface area to the aircraft 100 as desired. For example, the apparatus 112 may assist with low-speed operation (e.g., takeoff, landing, loitering) of a high-speed aircraft, while avoiding the weight, expense, and other design complications of a fixed/rigid wing, even one which is selectively deployable. The reels 232 may be operated as desired, manually and/or automatically, to change a shape of the wing 114, an attitude of the wing 114, a vertical distance of the wing 114 from the outer mold line 104, or any other traits as appropriate to produce a desired aerodynamic result.

Figure 7A:
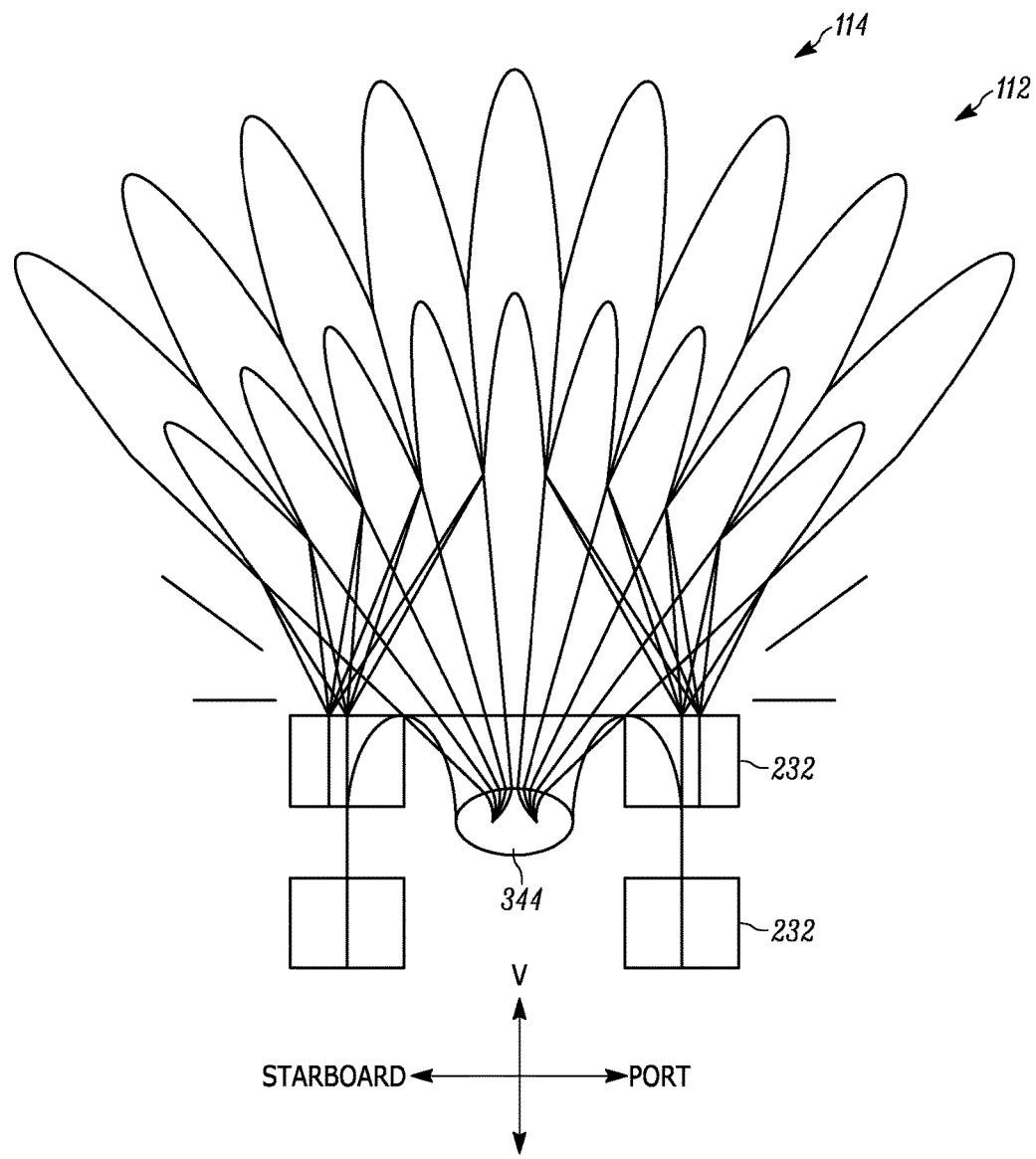
Figure 7B:
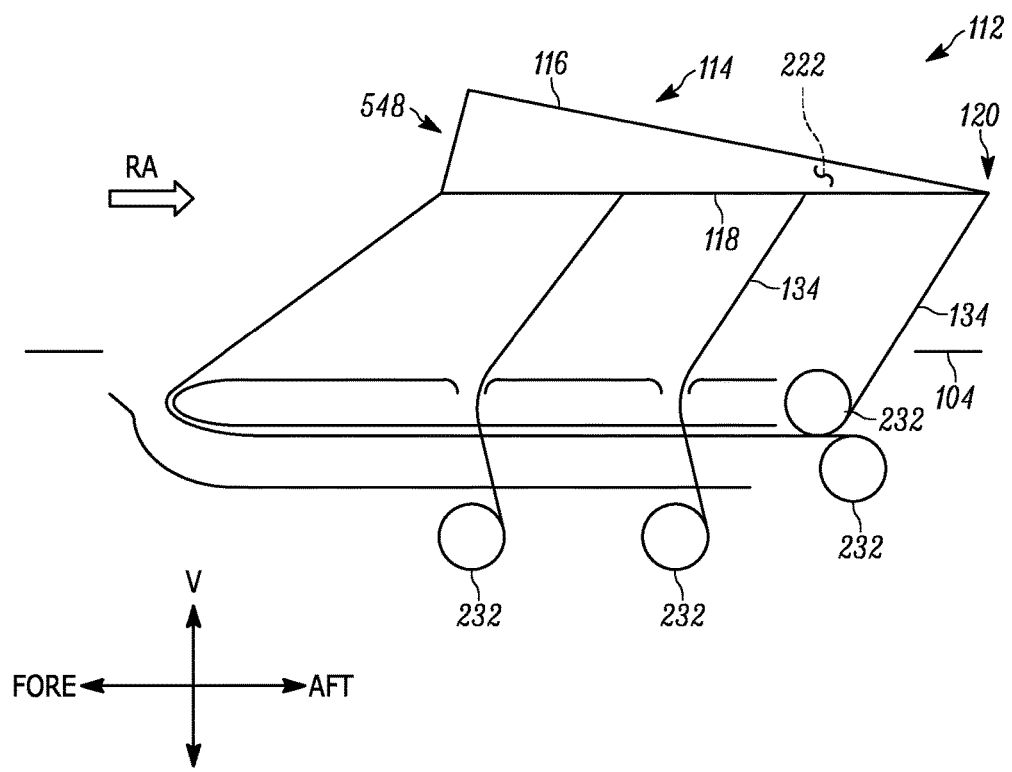

When it is no longer desirable for the wing 114 to assist with flight, the apparatus 112 can be operated to return the wing 114 from the deployed position to the stowed position. This occurs, in most cases, by substantially reversing the deployment sequence described above. FIGS. 7A-7B depict the wing 114 material being "gathered in" to deflate the wing 114, via selective operation of at least one reel 232 to retrace a corresponding suspension line 134.

Figure 8A:
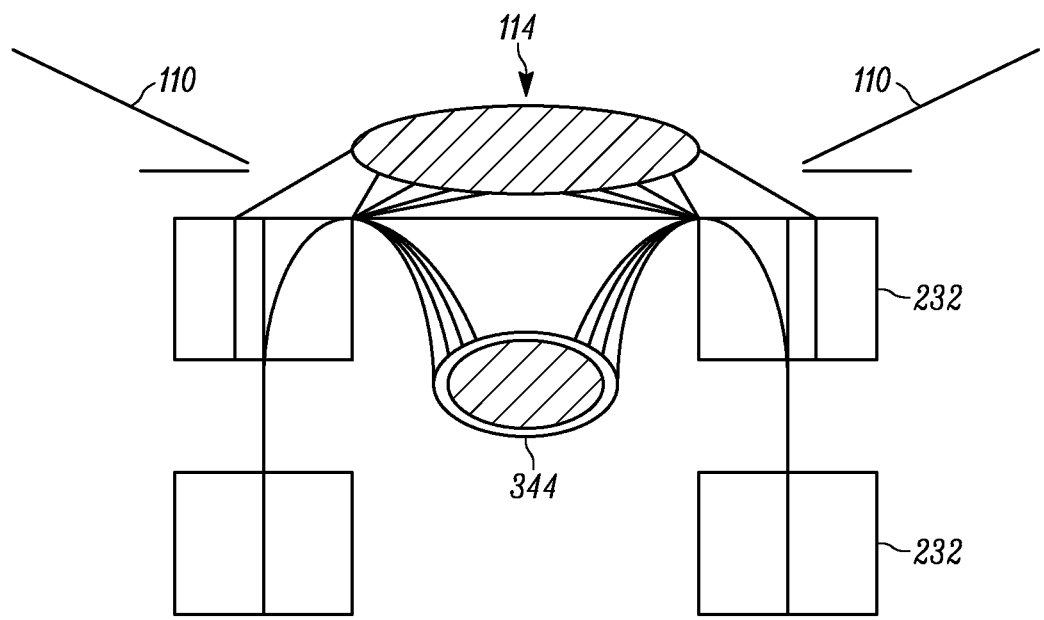
Figure 8B:
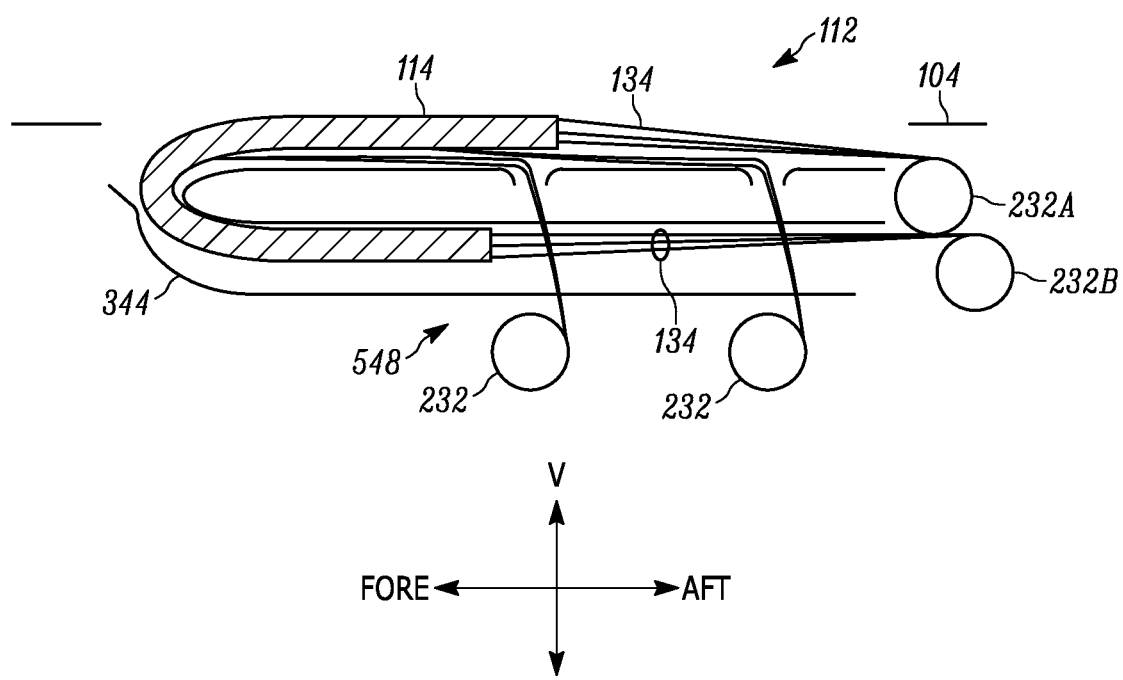

In FIGS. 8A-8B, the open fore edge 548 of the wing 114 has been returned to the interior space 106, such as into the canopy tube 344, through retraction of certain suspension lines 134. The cessation of ram air flow into the open fore edge 548 will help to deflate the wing interior 222, and ram air flowing past the upper wing panel 116 may press the wing 114 against another structure (e.g., the outer mold line 104) of the aircraft 100 and further help to deflate and compact the wing 114. As shown in FIGS. 8A-8B, reel 232B may be actuated to retract the suspension lines 134 attached thereto and thus draw the wing 114 fully back into the interior space 106, such as into the canopy tube 344, to return the wing 114 into the stowed condition in the interior space 106 of the aircraft 100. In FIGS. 8A-8B, the wing 114 is not fully stowed, but upon completion of the stowage procedure, the apparatus 112 will once again be in the fully stowed condition as depicted in FIGS. 3A-3B, and, when present, the compartment doors 110 can then be closed to restore the smooth contour of the outer mold line 104 of the aircraft 100.

It is contemplated that one or more of the interior baffles 228 (e.g., the "sidewall" interior baffles 228S and 228P) may be extended below the lower wing panel 118 to provide a desired aerodynamic effect such as, but not limited to, tip vortex reduction and/or yaw stability.

It is also contemplated that, for a particular use application, one of ordinary skill in the art can readily "rig" a wing 114 with a desired configuration (number, type, size, location, or the like) of suspension lines 134. For example, it may be desirable to avoid cascading port and starboard line groups or fore and aft line groups together, to maintain separate control over those groups. For example, the apparatus 112 is shown schematically in the Figures as having line strands 242 attached to the wing 114. It might thus be desirable to provide a wing 114 similar to that depicted with at least four separate line groups, with each group containing 10 lines connecting to a quarter of the wing 114, as divided into left/right and forward/aft segments. However, one of ordinary skill in the art can provide an appropriate configuration of suspension lines 134 to achieve desired performance, manufacturing, aerodynamic, operation, or any other goals for a particular apparatus 112.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. An apparatus for selectively increasing a wing area of an aircraft having a fuselage with an interior space, the apparatus comprising:
    an inflatable wing moveable between a stowed condition located in the interior space and a deployed condition located outside the interior space;
    a canopy tube located in the interior space, the inflatable wing being configured, in the stowed condition, to be at least partially contained within the canopy tube;
    a plurality of reels secured to the aircraft; and
    a plurality of suspension lines connecting the wing to the reels, at least one reel of the plurality of reels being operable to unwind a corresponding suspension line to allow the wing to inflate to the deployed condition exclusively by ram air generated by movement of the aircraft, and at least one reel of the plurality of reels being selectively operable to retract a corresponding suspension line to control deflation of the wing and return of the wing into the stowed condition.

2. The apparatus of claim 1, wherein the wing includes flexible upper and lower wing panels, each of the upper and lower wing panels being significantly longer in a starboard-port direction than in a fore-aft direction, the upper and lower wing panels being attached together at the aft portions thereof with the fore portions of the upper and lower wing panels being spaced apart, when the wing is in a fully deployed condition, to admit ram air into a wing interior space defined by the upper and lower wing panels.

3. The apparatus of claim 2, including at least one flexible interior baffle extending vertically between the upper and lower wing panels and substantially perpendicular thereto, each interior baffle being substantially oriented in a fore-aft direction to partition the wing interior into a plurality of interior compartments spaced apart in the starboard-port direction.

4. The apparatus of claim 1, wherein, when in the deployed condition, the wing is curved at least one of convexly-upward in the fore-aft direction and convexly-upward in the starboard-port direction.

5. The apparatus of claim 1, wherein the wing is made substantially from a flexible sheet material.

6. The apparatus of claim 1, wherein at least one suspension line includes selectively vertically spaced proximal and distal line portions with a line junction located vertically therebetween, the proximal line portion having a single line strand and being connected to a selected reel, and the distal line portion including a plurality of line strands, each line strand being connected to the wing at a location spaced from the other line strands of that suspension line, the plurality of line strands being aggregated at the line junction into the single line strand connected to the selected reel.

7. The apparatus of claim 1, wherein the plurality of reels is configured for selective operation to selectively change a surface area of a forward edge of the wing during transition of the wing between the stowed and deployed conditions.

8. An aircraft comprising:
    an outer mold line on a fuselage of the aircraft;
    an interior space within the fuselage;
    an inflatable wing moveable between a stowed condition, wherein the wing is substantially contained within the interior space and a deployed condition, wherein the inflatable wing is located wholly outside the outer mold line, in the ambient space, the inflatable wing including substantially planar flexible upper and lower wing panels being attached together at an aft edge thereof and including space vertically therebetween, when the wing is in the deployed condition, to form a wing interior configured to accept, and thus become inflated by, ram air flow;
    a canopy tube within the interior space, the canopy tube configured to at least partially contain the inflatable wing in the stowed condition;
    a plurality of reels secured to the aircraft within the interior space; and
    a plurality of selectively vertically extending suspension lines connecting the wing to the reels, at least one reel of the plurality of reels being selectively operable to extend a corresponding suspension line to allow the wing to inflate to the deployed condition exclusively by ram air flow generated by movement of the aircraft, and at least one reel of the plurality of reels being selectively operable to retract a corresponding suspension line to control deflation of the wing and return of the wing into the stowed condition.

9. The aircraft of claim 8, including at least one flexible interior baffle extending vertically between the upper and lower wing panels and substantially perpendicular thereto, each interior baffle being substantially oriented in a fore-aft direction to partition the wing interior into a plurality of interior compartments spaced apart in the starboard-port direction.

10. The aircraft of claim 8, wherein, when in the deployed condition, the wing is curved convexly-upward in the fore-aft direction and convexly-upward in the starboard-port direction.

11. The aircraft of claim 8, wherein at least one suspension line includes vertically spaced proximal and distal line portions with a line junction located vertically therebetween, the proximal line portion having a single line strand and being connected to a selected reel, and the distal line portion including a plurality of line strands, each line strand being connected to the wing at a location spaced from the other line strands of that suspension line, the plurality of line strands being aggregated at the line junction into the single line strand connected to the selected reel.

12. A method of use for a deployable wing for an aircraft having a fuselage with an interior space, the method comprising:
    providing an inflatable wing selectively movable between stowed and deployed conditions, the wing having an open fore edge and a substantially closed aft edge and a wing interior located laterally therebetween, the wing being secured to the aircraft at least by a plurality of suspension lines connecting the wing to a plurality of reels in the interior space;
    substantially containing the wing within the interior space when the wing is in the stowed condition, including at least partially containing the wing within a canopy tube located in the interior space;
    exposing the open fore edge of the wing to ram air generated by movement of the aircraft to allow the wing interior to inflate with the ram air;
    deflating the wing interior of the wing in the deployed condition by selectively operating at least one reel to retract a corresponding suspension line; and
    returning the wing from the deployed condition to the stowed condition in the interior space of the aircraft.

13. The method of claim 12, including opening the interior space to ambient space.

14. The method of claim 12, wherein exposing the open fore edge of the wing to ram air generated by movement of the aircraft to allow the wing interior to inflate with the ram air includes operating at least a chosen one of the reels to extend the suspension line attached to the chosen reel.

15. The method of claim 14, wherein exposing the open fore edge of the wing to ram air generated by movement of the aircraft to allow the wing interior to inflate with the ram air includes operating at least a chosen other one of the reels to retract the suspension line attached to the chosen other reel.

16. The method of claim 12, wherein exposing the open fore edge of the wing to ram air generated by movement of the aircraft to allow the wing interior to inflate with the ram air includes operating at least one reel to pull the aft edge of the wing in an aft direction from the canopy tube.

17. The method of claim 12, wherein at least one suspension line includes vertically spaced proximal and distal line portions with a line junction located vertically therebetween, the proximal line portion having a single line strand and being connected to a selected reel, and the distal line portion including a plurality of line strands, each line strand being connected to the wing at a location spaced from the other line strands of that suspension line, the plurality of line strands being aggregated at the line junction into the single line strand connected to the selected reel, the method including operating the selected reel to concurrently extend or retract the plurality of line strands of that suspension line.

18. The method of claim 12, including selectively changing a surface area of a forward edge of the wing during transition of the wing between the stowed and deployed conditions by selective operation of at least one reel.

\* \* \* \* \*